United States Patent [19]

Daniels et al.

[11] Patent Number: 5,053,279

[45] Date of Patent: Oct. 1, 1991

[54] GRANULAR BITUMEN COATED WITH CARBON BLACK OR SILICA

[75] Inventors: Ivo Daniels, Hanau; Reinhard Manner, Maintal; Karl H. Mueller, Bruchkoebel; Walter Barthel, Langenselbold, all of Fed. Rep. of Germany

[73] Assignee: Degussa Aktiengesellschaft, Frankfurt am Main, Fed. Rep. of Germany

[21] Appl. No.: 388,530

[22] Filed: Aug. 2, 1989

[30] Foreign Application Priority Data

Aug. 4, 1988 [DE] Fed. Rep. of Germany ....... 3826497

[51] Int. Cl.$^5$ .................... B32B 11/04; B32B 11/12; C08L 95/00
[52] U.S. Cl. ............................. 428/405; 106/281.1; 427/213; 428/403
[58] Field of Search ............................ 428/403, 405; 106/281.1; 427/213, 222

[56] References Cited

U.S. PATENT DOCUMENTS

| | | | |
|---|---|---|---|
| 4,168,178 | 9/1979 | Hessler | 106/278 |
| 4,375,988 | 3/1983 | Mueller et al. | 106/281.1 |
| 4,378,999 | 4/1983 | Müller et al. | 106/284.01 |
| 4,410,589 | 10/1983 | Müller et al. | 428/331 |
| 4,710,229 | 12/1987 | Muller et al. | 106/287.34 |

*Primary Examiner*—George F. Lesmes
*Assistant Examiner*—Christopher Brown
*Attorney, Agent, or Firm*—Beveridge, DeGrandi & Weilacher

[57] ABSTRACT

A free-flowing granular bitumen product containing from 0.5 to 6% by weight of a powdery coating and separating agent such as synthetic silica or carbon black is prepared by atomizing hot, liquid bitumen in a spray mixer while simultaneously introducing the powdery coating and separating agent by means of the cold air flow into the spray mixer.

7 Claims, 1 Drawing Sheet

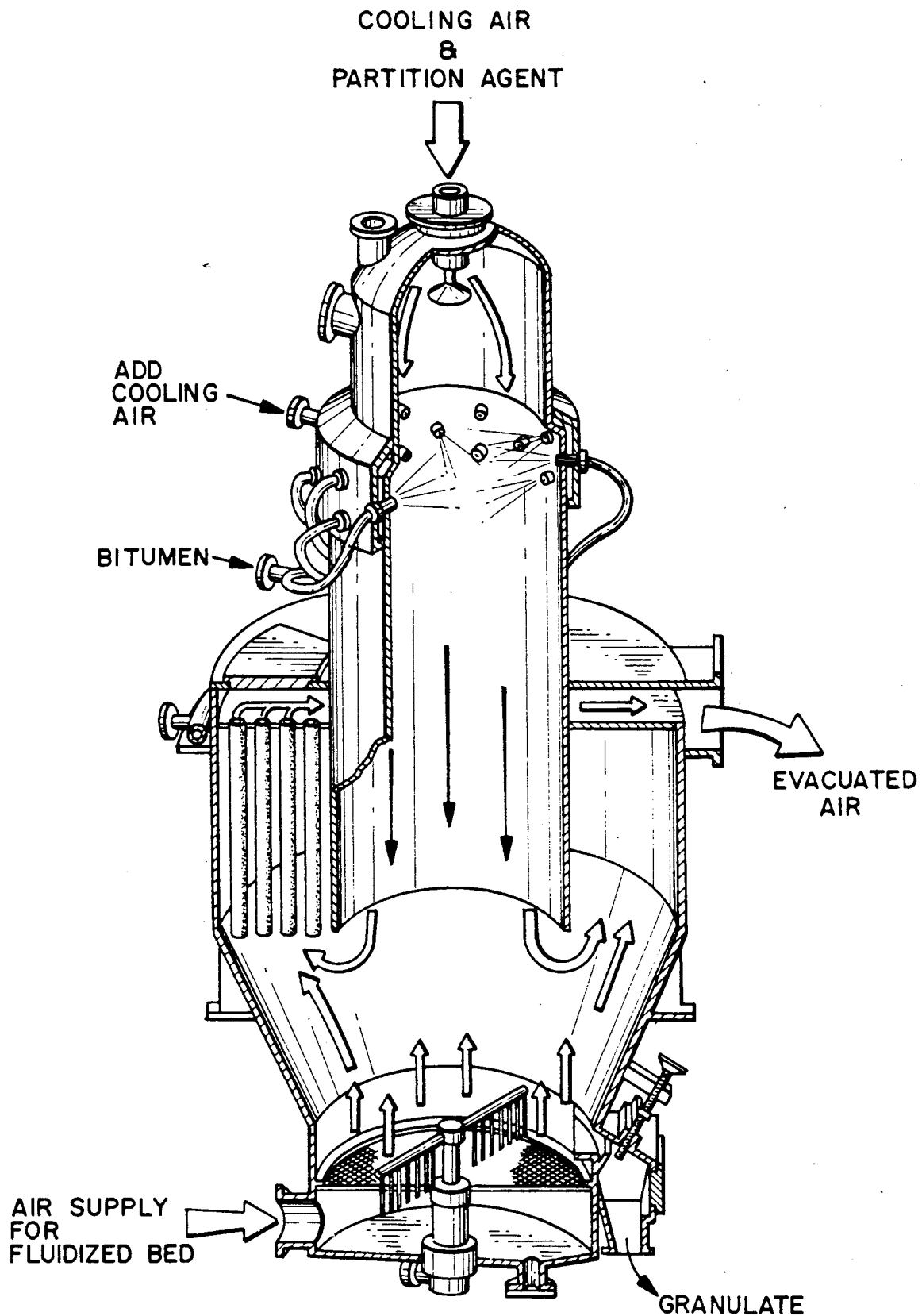

GRANULAR BITUMEN COATED WITH CARBON BLACK OR SILICA

The present invention relates to a granular bitumen product and the process for its manufacture.

INTRODUCTION AND BACKGROUND

Bitumen is a petroleum product obtained by a process of refining the petroleum. Bitumen is a high molecular weight mixture of hydrocarbons, with a dark color; ranging in viscosity from a barely fluid, sticky to a brittle consistency. It is further characterized by hydrophobic properties (see DIN 55 946).

Because of its thermoplastic behavior, bitumen is easily worked at high temperatures.

For most applications, for instance in making asphalt mixes for road construction or bituminous roofings, the bitumen must be delivered in the heated, fluid state from the refinery and must be kept ready in insulated storage tanks.

It is known to make a powdery bitumen concentrate with a content in silica of 10 to 80% by weight by spraying the liquid bitumen onto the silica (German Patent 29 33 339).

The known bitumen concentrates are used in the industry to enhance the toughness properties of asphalt mixes employed for road construction.

The known bitumen concentrate suffers from the drawback that because of its high silica content, dilution by means of further bitumen (binder) always is required during processing.

Accordingly, there is a need for a friable, i.e. free-flowing, bitumen which can be added directly; that is without being molten first, to the mineral mix, without addition of further liquid or solid binder. Further, there is a need to avoid the often undesired stiffening due to the high proportion of silica.

SUMMARY OF THE INVENTION

An object of the present invention is to provide a friable, granular bitumen product containing between 0.5 and 6% by weight of powdery coating substance and separating agent such as synthetic silica or carbon black.

In a more detailed and preferred aspect of the invention, the content in powdery coating material and separating agent is between 1.5 and 3% by weight.

The bulk density of the free-flowing granular bitumen product o the invention is between 400 and 800 g/liter (measured per DIN 53,912).

The particle size of the granular bitumen product of the invention is between 500 and 700 microns ($\mu$).

All known kinds of bitumens may be used as the starting bitumen substance of the present invention. Especially suitable bitumen types for purposes of the present invention are those that are solid at room temperature.

Softer types of road construction bitumens, such as B 200, are hardly suitable.

The powdery cladding or coating material and separation agents that are useful in connection with the granular bitumen according to the invention are synthetic silicas prepared pyrogenically or by precipitation, or carbon black. All such substances and their respective methods of preparation are known in the art.

Suitable synthetic silicas for preparing the granular bitumen products of the present invention are, for instance, those described in WINNACKER-KUECHLER, Chemische Technologie, Vol. 3, Anorganische Technologie II, 4th edition, Carl Hauser Verlag, Munich, Vienna, 1983, pp. 75–90, incorporated herein by reference.

Pyrogenic silica prepared by flame hydrolysis, and further, precipitation silicas are especially useful, preference being given to silicas made by the well known precipitation technology.

The precipitated silicas may be used unground or ground, spray-dried or spray-dried and ground.

Illustratively, the following precipitated silicas may be used, the preferred precipitated silica is identified by the trade name SIPERNAT 22 LS:

|  |  | FD 320 DS | Durosil | Sipernat 22 | Sipernat 22 S | Sipernat 22 LS |
|---|---|---|---|---|---|---|
| BET surface area[1] | m$^2$g | 170 | 60 | 190 | 190 | 190 |
| Average primary particle size | nm | 18 | 40 | 18 | 18 | 4.5 |
| Tamped density[2] | g/l | 80 | 210 | 270 | 120 | 80 |
| pH value[3] |  |  | 6.3 | 9 | 6.3 | 6.3 | 6.3 |
| Sifting Residue (acc. Mocker) (45 $\mu$m)[4] | % | 0.01 | 0.3 | 0.5 | 0.1 | 0.1 |
| Drying loss (2h, 105° C.)[5] | % | 6 | 6 | 6 | 6 | 6 |
| Ignition loss (2h, 1000° C.)[5][6] | % | 5 | 6 | 5 | 5 | 5 |
| SiO$_2$[7] | % | 98 | 98 | 98 | 98 | 98 |
| Na$_2$O[7] | % | 1 | 1 | 1 | 1 | 1 |
| Fe$_2$O$_3$[7] | % | 0.03 | 0.03 | 0.03 | 0.03 | 0.03 |
| SO$_3$[7] | % | 0.8 | 0.8 | 0.8 | 0.8 | 0.8 |

[1]DIN 66 131
[2]DIN 53 194 (unsifted), ISO 787/XI or JIS K 5101/18
[3]DIN 53 200 (in 5% aqueous dispersion) ISO 787/IX, ASTM D 1208 or JIS K 5101/24
[4]DIN 53 580, ISO 787/XVII or JIS K 5101/20
[5]DIN 55 921, ASTM D 1208 or JIS K 5101/23
[6]referred to the substance dried for 2 hours at 105° C.
[7]referred to the substance baked 2 hours at 1000° C.

|  |  | Extrusil |
| --- | --- | --- |
| BET surface area[1] | m²/g | 35 |
| Average primary particle size | nm | 25[9] |
| Tamped density[2] | g/l | 300 |
| pH value[3] |  | 10 |
| Sifting Residue (acc. Mocker) (45 μm)[4] | % | 0.2 |
| Drying loss (2 h, 105° C.)[5] | % | 6 |
| Ignition loss (2 h, 1000° C.)[5][6] | % | 7 |
| $SiO_2$[7] | % | 91 |
| $Al_2O_3$[7] | % | 0.2 |
| $CaO$[7] | % | 6 |
| $Na_2O$[7] | % | 2 |
| $Fe_2O_3$[7] | % | 0.03 |
| $SO_3$[7] | % | — |
| $Cl$[7] | % | 0.8 |

[1] DIN 66 131
[2] DIN 53 194 (unsifted), ISO 787/XI or JIS K 5101/18
[3] DIN 53 200 (in 5% aqueous dispersion), ISO 787/IX, ASTM D 1208 or JIS K 5101/24
[4] DIN 53 580, ISO 787/XVII or JIS K 5101/20
[5] DIN 55 921, ASTM D 1208 or JIS K 5101/23.
[6] referred to the substance dried for 2 hours at 105° C.
[7] referred to the substance baked for 2 hours at 1000° C.
[8] cannot be measured reproducibly
[9] because of strong intergrowths, the size of the primary particles cannot be accurately determined in silicates
[10] total baking loss for 1 hour at 800° C.
[11] referred to the substance baked 1 hour at 800° C.

The physical-chemical characteristics of the above products are determined using the following methods:

pH value, DIN 53 200

The pH value is determined electrometrically be means of a glass electrode and a pH meter. As a rule, the pH of silicas is in the neutral range and that of silicates in the weakly alkaline range.

Sifting residue, DIN 53 580

The sifting residue is a criterion of the fine particulate nature of the substance. In order to detect the non-dispersing portions, or those difficult to disperse and present in minute amounts in precipitated silicas and silicates, the sifting residue is tested according to the method of Mocker. In this procedure, a suspension of silica is washed at 4 bar water pressure through the sieve. The sieve is then dried and the sifting residue is weighed. The applicable sieves are the 45 micron types, corresponding to 325 mesh in ASTM.

BET surface, DIN 66 131

The surface area of silicas and silicates is measured in m²/g by the BET method.

This procedure is based on the adsorption of gaseous nitrogen at the temperature of liquid nitrogen. The areameter method by Haul & Duembgen can be applied advantageously. Calibration is required. Both the "inner" and the "outer" surfaces are determined.

Average size of primary particles

Electromicroscope photographs allow determining the mean size of the primary particles. The diameters of about 3,000 to 5,000 particles are determined and their arithmetic average is then computed. As a rule, the individual dual primary particles are not present as such but are combined in aggregates and agglomerates. The "agglomerate" particle size of precipitated silicas and silicates depends on the particular grinding method.

Tamped density, DIN 53 194

This represents a measure of the weight of the powdery product. About 200 ml silica are tamped 1,250 times into the measurement cylinder of the tamping volume meter. The tamped density is computed from the input weight and the volume, and is stated in g/liter.

Drying loss, DIN 55 921

The precipitation products contain a small proportion of physically bound water. After drying 2 hours in the drying cabinet at 105° C., most of the physically bound water will have been removed.

Ignition loss, DIN 55 921

After 2 hour baking at 1000° C., the chemically bound water in the form of silanol groups also will have been removed. The ignition loss is determined from the substance dried for 2 hours at 105° C.

The FK 320 DS precipitated silica was steam-jet ground following drying in the rotating cylinder.

The Durosil precipitated silica is unground and dried in a rotary cylinder.

The Sipernat 22 precipitated silica is spray dried.

The Sipernat 22 S is spray dried and ground precipitated silica.

The Sipernat 22 LS precipitated silica is spray dried and air jet ground.

The Exclusil precipitated silica contains a slight amount of calcium silicate.

The carbon blacks suitable for use with the granular bitumen of the invention can be made conventionally, for instance, the methods for lampblack, gas black or continuous furnace black (ULLMANNS Enzyklopaedie der technischen Chemie, 4th Edition, Vol. 14, pp. 633–48).

In a preferred aspect of the invention, the carbon black known as PRINTEX XE2 with the characteristics below may be used.

| Specific surface area |  |  |
| --- | --- | --- |
| per BET DIN 66 132/ASTM D 3037 | (m²/g) | 1000 |
| per iodine adsorption DIN 53 582/ASTM D 1510 (input 0.05 g) | (mg/g) | 1000 |
| DBP-Adsorption DIN 53 601/ASTM D 2414 (input 10 g) | (ml/100 g) | 370 |
| pH value DIN 53 200/ASTM 1512 |  | 8 |
| Tamped density DIN 53 194/ISO 787 XI | (g/l) | 140 |
| Drying loss DIN 53 198/ASTM D 1509 | (%) | max. 1 |
| Ignition residue DIN 53 586/ASTM D 1506 | (%) | max. 1 |
| Sifting residue per Mocker DIN 53 580/ASTM D 1514 | (%) | max. 0.05 |

In accordance with another embodiment of the invention, the process for preparing the granular bitumen is carried out by atomizing hot, liquid bitumen in a spray mixer of any suitable type and simultaneously introducing the powdery coating and separating agent by means of a flow of cold air into the spray mixer.

In this aspect of the invention, the liquid bitumen droplets cool in the flow of cold air. During this stage, the bitumen droplets are clad by the powdery coating or cladding substance and separating agent and thereby are preserved from caking and adhering to the boundary surfaces.

In the cold state, the bitumen will be solid. It must be molten before being introduced into the spray mixer.

The processing of liquid and hot bitumen directly obtained from the refinery, or the stationing of the spray mixer in the refinery, is an especially economical mode of carrying out the invention.

Preferably, the following parameters are observed in practicing the process of the invention:

| bitumen temperature | >180° C. |
| cooling air temperature | <10° C. |
| bitumen viscosity when spraying | 70 cp. |

The granular bitumen product prepared in accordance with the invention can be mixed with further powdery cladding and separation agents.

The granular bitumen product of the invention retains the type-specific properties of the input bitumen and following melting acts as a binder.

The portions of powder-cladding and separation agents may serve as additives in various applications.

The granular bitumen of the invention offers the following advantages:

It can be manufactured in the refinery. In the course of the transfer of the mineral oil processing sites from the industrial or consuming countries to the countries of petroleum extraction, problems may arise in transporting the "distillation bottoms" bitumen in the form of a tough, elastic-viscous material.

Pouring the bitumen into blocks for transport requires melting at the site of processing before introduction in the process for utilization.

The marketing of a powder material is more easily handled. Small to medium sales quantities can be packaged in ecologically harmless paper bags. Beyond that, drums and bins can be used.

In general, cold bulk material is easier to meter and control than hot liquid material.

The mixing equipment can be simplified for the preparation of road constructions asphalt, both as regards bitumen stock and mixing technology.

The preparation and processing of bituminous roofing materials is facilitated.

The manufacture of construction protective materials (for instance bituminous lacquers and paints) based on solvents or emulsions is facilitated.

The granular bitumen of the invention is a cold applied, powdery binder which becomes suitable for use by heating on the spot as, for instance, by melting. Thereby, it is possible to carry out repairs at the construction site, on streets, bridges, roofs, and the like.

The granular bitumen product of this invention allows for simplifying the production of special materials as, for instance, insulating panels by using the granular bitumen in hot pressing.

BRIEF DESCRIPTION OF THE DRAWING

The invention will be further understood with reference to the drawing which shows an apparatus for carrying out the invention.

DETAILED EMBODIMENTS OF THE INVENTION

Example

A granular bitumen product is prepared by the spray granulation method. The equipment includes a spray granulator made by Luco-Spruehmisch-Technic GmbH, a melting station and a mixer. A conventional, cold-type bitumen is heated to form a melt in the melting vessel. Then, the liquid bitumen is atomized in the spray granulator. The granulation of the bitumen takes place in conventional manner in the spray tower. Silica (Sipernat 22 S) is used as the powdering and separation agent. The cooled granular bitumen is post-treated by tumbling in a mixer.

The melting station is composed of a vessel heated by strip heaters. However different heating, for instance with a double wall and fuel oil, is quite suitable.

The temperature in the vessel is thermostatically controlled. With the present day outfitting of the equipment, a temperature of about 250° C. can be achieved. For some types of bitumen difficult to melt, a higher temperature range is needed (300–350° C.).

The material is pumped out of the vessel. To compensate for the pulses produced by the reciprocating pump, a pulse damper is installed on the pressure side of the pump. The pulse damper is a pipe mounted on the pump's pressure side. This pipe is sealed at the top side by a flange. A manometer is mounted on said flange. In operation, the pump first moves the bitumen into the pulse damper, creating an air cushion. This air cushion compensates substantially for the pump generated pulse and when the bitumen is atomized makes possible an almost constant spray cone.

All conduits from the vessel are simultaneously heated up to 250° C. The conduit from the vessel either goes to the spray granulator or back to the vessel.

At an approximate temperature of 200° C. (the exact temperature being a function of the kind of bitumen), the bitumen enters the spray granulator made by the Luco Co. This equipment combines two procedures; namely, the techniques of the fluidized bed and of atomization. The bitumen is atomized in the upper part of the tower. Simultaneously silica (e.g. Sipernat 22 S) is added as the powdery coating and separating agent to the spray tower. The cooling bitumen particles are clad or coated with the silica agent which prevents the bitumen from sticking to itself. The partially still hot granular bitumen drops further inside the tower and arrives at the fluidized bed serving to further cool the granular bitumen. Only when the bitumen has given up also its internal heat does it leave the spray granulator apparatus. Thereupon, the free-flowing bitumen product can be bagged or, if called for, post-treated such as by mixing.

The drawing shows the spray granulator. The spray mixing vessel forms a vertically oriented spraying zone for spraying in the bitumen and coating agent and for mixing the two together. This zone has an upper region where the components are introduced and a lower region which is located above and leads to the fluidized bed located beneath the spray tower. This vessel is 3 m high and 2 m in diameter. The height of the spray tower is determined by the falling distance required to cool the granulate.

The vessel diameter shall be at least 1 m more than the largest spray-cone diameter formed in the upper region of the spraying-mixing zone. The purpose is to prevent the sprayed material from being atomized against the wall. The spray cone diameter is determined empirically and must be ascertained by prior trials. As regards bitumen, the value of the spray cone diameter can be obtained by calculating only with much difficulty.

Nozzles for single and binary substances and rotating disks can be used for atomization. Binary nozzles provide a smaller average particle size than single substance nozzles; that is, the total surface of the granulate obtained from binary nozzles is substantially larger than that from single substance nozzles. Accordingly, much less silica separation agent is required by single substance nozzles and furthermore operational difficulties hardly arise. Single substance nozzles with a minimum bore of 1 mm are used.

Smaller nozzle diameters result in undesired clogging. The minimum diameter is determined empirically. The spray cone is selected as large as possible (120°) in order to achieve optimal exchange of heat and material.

The bitumen leaves the nozzle at a pressure of 12 bars. This nozzle has a bore of 1.5 mm. Under these conditions, the bitumen granulate capacity reached is 76 kg/h.

According to the desired flow, the silica separation agent is metered through a vibration chute to the tower. The granular bitumen drops into a vibration fluidized bed. Two blowers deliver the air of fluidization. In the experimental equipment, one blower flow is 20 $m^3$/min. The second blower output is 10 $m^3$/min. The air in the tower is evacuated above the fluidized bed through a filter by means of a third fan. The flow from this fan is 60 $m^3$/min. The excess air proportion is sucked through an opening 400 mm in diameter at the top of the tower as secondary air. This secondary air migrates in concurrent flow with the main product flow through the spray granulator. This design allows pulsed cooling of the just sprayed bitumen. A counterflow method, whereby the air would be evacuated from the top of the tower, also is suitable. In that case, the dwell time of the granulate in the tower would be increased.

Experiment has shown that the ambient air sucked in does not fully cool the hot granular bitumen. Accordingly, cooling equipment was installed next to the tower to cool the air down to as low as 10° C.

The cooled granular bitumen exists from the spray granulator through a bagging means. Where called for, the bitumen can be subjected to post treatment. The purpose of this post treatment is precise adjustment of the silica separation agent content and treatment of the granulate surface for complete cladding with the silica separation agent. A drum mixer is used for this mixing type post treatment. Any other mixer will also be suitable provided it is gentle in its effect on this granulate.

Further variations and modifications of the invention will be apparent to those skilled in the art from the foregoing and are intended to be encompassed by the claims appended hereto.

German priority application P 38 26 497.8-45 is relied on and incorporated by reference.

We claim:

1. A friable, granular bitumen product comprising finely divided bitumen coated with from 0.5 to 6% by weight of a powdery coating and separation agent selected from the group consisting of synthetic silica and carbon black.

2. The friable granular bitumen product according to claim 1 wherein the said agent is present in the amount of 1.5 to 3% by weight.

3. The friable granular bitumen product according to claim 1 wherein the bitumen has a bulk density of between 400 and 800 g/liters.

4. The friable granular bitumen product according to claim 1 wherein the bitumen has a particle size of between 500 and 700 microns.

5. The friable granular bitumen product according to claim 1 wherein the silica is a pyrogenic or precipitated silica.

6. A friable, granular bitumen product comprising finely divided bitumen coated with from 0.5 to 6% by weight of a powdery coating and separation agent selected from the group consisting of synthetic silica and carbon black, said bitumen product made by the process comprising atomizing hot, liquid bitumen into a spraying and mixing zone and simultaneously introducing into said zone a powdery coating and separating agent selected from the group consisting of synthetic silica and carbon black by means of the flow of cold air.

7. The friable, granular bitumen product according to claim 6, wherein the temperature of the liquid bitumen is greater than 180° C. and the temperature of the cooling air is less than 10° C.

* * * * *